United States Patent
Yatsu et al.

(10) Patent No.: US 9,451,483 B2
(45) Date of Patent: Sep. 20, 2016

(54) MOBILE COMMUNICATION SYSTEM, COMMUNICATION SYSTEM, CONTROL NODE, CALL-PROCESSING NODE, AND COMMUNICATION CONTROL METHOD

(71) Applicant: NTT DOCOMO, INC., Chiyoda-ku (JP)

(72) Inventors: Bunpei Yatsu, Chiyoda-ku (JP); Takahiro Yamazaki, Chiyoda-ku (JP); Motoshi Tamura, Chiyoda-ku (JP); Tetsuya Nakamura, Chiyoda-ku (JP); Shigeru Iwashina, Chiyoda-ku (JP); Takashi Shimizu, Chiyoda-ku (JP)

(73) Assignee: NTT DOCOMO, INC., Chiyoda-ku (JP)

( * ) Notice: Subject to any disclaimer, the term of this patent is extended or adjusted under 35 U.S.C. 154(b) by 0 days.

(21) Appl. No.: 14/379,230

(22) PCT Filed: Jan. 23, 2013

(86) PCT No.: PCT/JP2013/051299
§ 371 (c)(1),
(2) Date: Aug. 15, 2014

(87) PCT Pub. No.: WO2013/121841
PCT Pub. Date: Aug. 22, 2013

(65) Prior Publication Data
US 2015/0024761 A1    Jan. 22, 2015

(30) Foreign Application Priority Data
Feb. 16, 2012  (JP) ................................ 2012-032045

(51) Int. Cl.
*H04W 40/00* (2009.01)
*H04W 24/04* (2009.01)
(Continued)

(52) U.S. Cl.
CPC .......... *H04W 24/04* (2013.01); *H04L 41/0654* (2013.01); *H04L 43/0817* (2013.01);
(Continued)

(58) Field of Classification Search
CPC ... H04W 24/04; H04W 28/10; H04W 76/02; H04M 3/00
USPC ............. 455/445, 461, 414.4, 566, 561, 411, 455/423, 552.1, 560, 439, 433, 426.1; 709/226, 231, 227, 223, 221
See application file for complete search history.

(56) References Cited

U.S. PATENT DOCUMENTS 6,408,182 B1    6/2002 Davidson et al.
6,662,010 B1 *  12/2003 Tseitlin ................. H04W 76/02
                                         455/426.1
(Continued)

FOREIGN PATENT DOCUMENTS

JP    2003 244191    8/2003
JP    2010 224756    10/2010
(Continued)

OTHER PUBLICATIONS

Office Action issued Apr. 28, 2015 in Japanese Patent Application No. P2014-500135 (with English language translation).
(Continued)

*Primary Examiner* — Dhaval Patel
(74) *Attorney, Agent, or Firm* — Oblon, McClelland, Maier & Neustadt, L.L.P

(57) ABSTRACT

A mobile communication system includes a plurality of call-processing servers, a call processing management database that holds data necessary for call processing, and a network manager. The network manager comprises a node state recognition unit that recognizes states of the call-processing servers, and a control unit that determines the call-processing node that processes a call processing request based on the states. The call-processing server comprises a call processing request accepting unit that accepts a call processing request, an acquisition unit that acquires information of a mobile communication terminal related to the call processing request from the database, a call processing unit that performs call processing using the acquired information; and a call processing result storage unit that stores information of a result of the call processing in the database.

11 Claims, 6 Drawing Sheets

(51) Int. Cl.
　　*H04M 3/00*　　(2006.01)
　　*H04W 76/02*　　(2009.01)
　　*H04W 28/10*　　(2009.01)
　　*H04L 12/26*　　(2006.01)
　　*H04L 12/24*　　(2006.01)
　　*H04L 12/721*　　(2013.01)
　　*H04W 24/02*　　(2009.01)

(52) U.S. Cl.
　　CPC ............ *H04M 3/00* (2013.01); *H04W 28/10* (2013.01); *H04W 76/02* (2013.01); *H04L 45/38* (2013.01); *H04W 24/02* (2013.01)

(56) References Cited

U.S. PATENT DOCUMENTS

| 8,311,207 | B2* | 11/2012 | Gentile Polese et al. ............ 379/221.07 |
| 2005/0192005 | A1 | 9/2005 | Blom et al. |
| 2008/0161054 | A1 | 7/2008 | Kallio et al. |
| 2011/0205904 | A1 | 8/2011 | Nakagawa |
| 2013/0046882 | A1 | 2/2013 | Takashima et al. |

FOREIGN PATENT DOCUMENTS

| JP | 2011 18106 | 1/2011 |
| JP | 2011 170656 | 9/2011 |
| JP | 2011 188320 | 9/2011 |
| JP | 2011-193038 A | 9/2011 |
| WO | WO 2011/083786 A1 | 7/2011 |

OTHER PUBLICATIONS

English translation of the International Preliminary Report on Patentability and Written Opinion issued Aug. 28, 2014, in PCT/JP2013/051299.

Manabu Ito, et al., "A Proposal of OpenFlow-based Routing Method for Call Session Control Message", Proceedings of the 2011 IEICE General Conference, p. 13, (Feb. 28, 2011) (with partial English translation).

Bumpei Yatsu, et al., "An Approach for Using Network Virtualization Technology in Mobile Communication Networks", ICT Network Cloud Research Group, Research Laboratories, NTT DoCoMo, Inc., vol. 6, p. 581, (Mar. 6, 2011) (with partial English translation).

International Search Report Issued Apr. 9, 2013 in PCT/JP13/051299 Filed Jan. 23, 2013.

Japanese Office Action issued Aug. 18, 2015 in Patent Application No. 2014-500135 (with English Translation).

Extended European Search Report issued Oct. 5, 2015 in Patent Application No. 13748575.1.

"LDF based solution for S-CSCF re-selection", 3GPP TSG SA WG2 Meeting #76 TD S2-097141, China Mobile, XP 50397973A, (Nov. 16-20, 2009), pp. 1-2.

\* cited by examiner

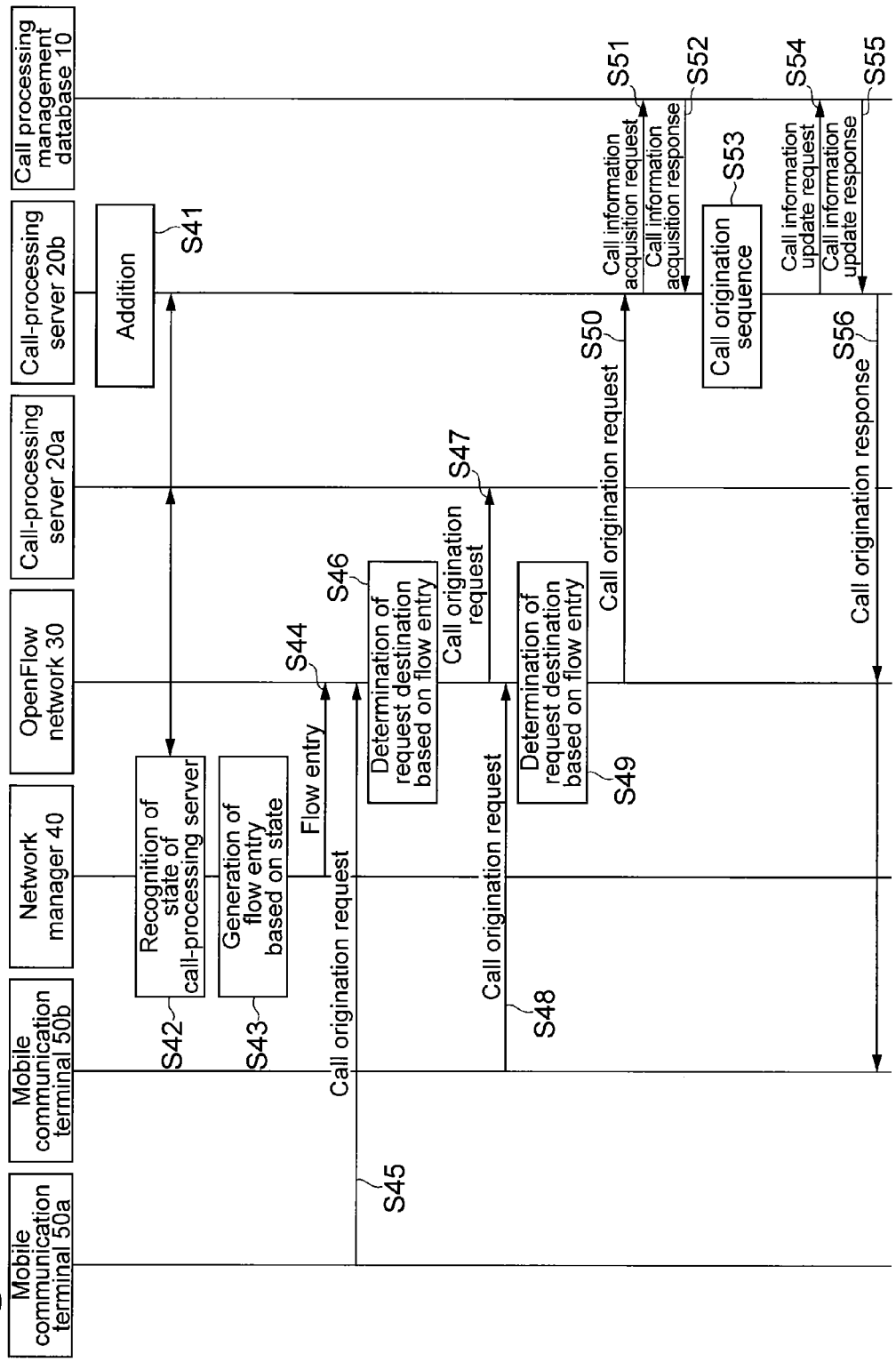

MOBILE COMMUNICATION SYSTEM, COMMUNICATION SYSTEM, CONTROL NODE, CALL-PROCESSING NODE, AND COMMUNICATION CONTROL METHOD

TECHNICAL FIELD

The present invention relates to a mobile communication system, a communication system, a control node and a call-processing node included in the mobile communication system or the communication system, and a communication control method performed by the same.

BACKGROUND ART

In a mobile communication system, a call-processing node that performs call processing is subject to planned stops for the purpose of maintenance or the like, and sudden stops due to occurrence of malfunctions. In a call processing system of the mobile communication system, redundancy is required such that a communication call is not disconnected in either of the cases described above. Therefore, a call-processing node of an active system (act) and a call-processing node of a standby system (sby) are provided to perform redundancy (multiplexing) of a device (e.g., see Patent Literature 1).

CITATION LIST

Patent Literature

[Patent Literature 1] Japanese Patent Laid-Open Publication No. 2003-244191

SUMMARY OF INVENTION

Technical Problem

Currently, the multiplexing of the devices described above is performed by synchronizing states between act/sby in real time by developing highly available middleware and a communication application in units of nodes. Therefore, a pair of servers in an act/sby configuration are fixedly assigned and only servers in call-processing nodes are paired. Therefore, the act/sby may not be simultaneously available and the redundancy may not function due to damage of a communication building or the like at the time of a disaster. As described above, in a duplex configuration, the sby-based device is not shared among a plurality of act-based devices and a double amount of facilities is simply held, which is economically inefficient.

Further, since the call-processing node performs only call processing for users accommodated by the device, when any call-processing node malfunctions, communication of the users accommodated by the device cannot be performed. Particularly, in mobile communication, since users gather in a specific area, the users may be unevenly accommodated.

Further, when the call-processing node is scaled out to improve performance, there is no means of moving users to an added call-processing node during communication. Since a scheme of moving users to a new server through a position registration process (attachment process) triggered by, for example, power off/on of a mobile device should be used, the scale-out takes long time.

The present invention has been made in view of the problems described above, and an object of the present invention is to provide a mobile communication system, a communication system, a control node, a call-processing node, and a communication control method that are capable of realizing redundancy of a call-processing node having excellent reliability, economic efficiency, and flexibility.

Solution to Problem

In order to achieve the above object, a mobile communication system according to an embodiment of the present invention is a mobile communication system that provides a mobile communication function to a mobile communication terminal and includes a plurality of call-processing nodes, a call processing management database that is connected to each of the plurality of call-processing nodes and holds data of each mobile communication terminal necessary for call processing, and a control node, wherein the control node comprises a node state recognition means that recognizes states of the plurality of call-processing nodes; and a control means that determines the call-processing node that processes a call processing request from the mobile communication terminal based on the states of the plurality of call-processing nodes recognized by the node state recognition means and performs control so that the call processing request is processed by the determined call-processing node, and the call-processing node comprises a call processing request accepting means that accepts the call processing request controlled by the control node; an acquisition means that acquires information of the mobile communication terminal related to the call processing request accepted by the call processing request accepting means from the call processing management database; a call processing means that performs call processing related to the request using the information acquired by the acquisition means; and a call processing result storage means that stores information of a result of the call processing performed by the call processing means in the call processing management database.

In the mobile communication system according to one embodiment of the present invention, the data of each mobile communication terminal necessary for call processing is held in the call processing management database having a separate configuration from the call-processing node, and the information is referred to and newly stored each time the call processing is performed. Therefore, in the present mobile communication system, call processing related to any mobile communication terminal can be performed by any call-processing node. Also, in this mobile communication system, the call processing can be performed in the call-processing node determined by the control node for each call processing request instead of the determining which call-processing node will perform the call processing for each mobile communication terminal.

The call-processing node may consist of a virtualized virtual machine, and the control node may further comprise a virtualization control means that controls the virtualization based on the states of the plurality of call-processing nodes recognized by the node state recognition means. In accordance with this configuration, it is possible to perform appropriate virtualization according to the states of the call-processing nodes.

As described above, in the present mobile communication system, since the call processing can be executed by any call-processing node without an individual call-processing node being set as an sby system or an act system, it is possible to realize more economical redundancy of the call-processing node. Further, if any call-processing node is operating, it is possible to execute the call processing and thus realize more reliable redundancy of the call-processing node. It is also possible to easily realize the scale-out since an individual call-processing node does not hold the data of each mobile communication terminal necessary for call processing. Thus, according to the present mobile communication system, it is possible to realize the redundancy of the call-processing node having excellent reliability, economic efficiency, and flexibility.

The mobile communication system may further include a flow control network, and the control means may configure the flow control network so that the call processing request is processed by the determined call-processing node. In accordance with this configuration, since the redundancy of the call-processing node can be realized without depending on the position registration area or the like, it is possible to increase the effects of the present invention described above.

The control node and the call-processing node included in the mobile communication system described above have a new configuration and correspond to an invention. In other words, a control node according to one embodiment of the present invention is a control node in a mobile communication system that provides a mobile communication function to a mobile communication terminal and includes a plurality of call-processing nodes, a call processing management database that is connected to each of the plurality of call-processing nodes and holds data of each mobile communication terminal necessary for call processing, and the control node, the control node including: a node state recognition means that recognizes states of the plurality of call-processing nodes; and a control means that determines the call-processing node that processes a call processing request from the mobile communication terminal based on the states of the plurality of call-processing nodes recognized by the node state recognition means and performs control so that the call processing request is processed by the determined call-processing node.

A call-processing node is a call-processing node in a mobile communication system that provides a mobile communication function to a mobile communication terminal and includes a plurality of call-processing nodes, a call processing management database that is connected to each of the plurality of call-processing nodes and holds data of each mobile communication terminal necessary for call processing, and a control node, the call-processing node including: a call processing request accepting means that accepts a call processing request controlled by the control node; an acquisition means that acquires information of the mobile communication terminal related to the call processing request accepted by the call processing request accepting means from the call processing management database; a call processing means that performs call processing related to the request using the information acquired by the acquisition means; and a call processing result storage means that stores information of a result of the call processing performed by the call processing means in the call processing management database.

Incidentally, the present invention may be described not only as an invention of a mobile communication system, a control node and a call-processing node as described above, but also as an invention of a communication control method as follows. This differs only in category, and is substantially the same invention with the same operation and effects.

In other words, a communication control method according to one embodiment of the present invention is a communication control method in a mobile communication system that provides a mobile communication function to a mobile communication terminal and includes a plurality of call-processing nodes, a call processing management database that is connected to each of the plurality of call-processing nodes and holds data of each mobile communication terminal necessary for call processing, and a control node, the communication control method including: a node state recognition step for recognizing, by the control node, states of the plurality of call-processing nodes; a control step for determining, by the control node, the call-processing node that processes a call processing request from the mobile communication terminal based on the states of the plurality of call-processing nodes recognized in the node state recognition step, and performing control so that the call processing request is processed by the determined call-processing node; a call processing request accepting step for accepting, by the call-processing node, a call processing request controlled by the control node; an acquisition step for acquiring, by the call-processing node, information of the mobile communication terminal related to the call processing request accepted in the call processing request accepting step from the call processing management database; a call processing step for performing, by the call-processing node, call processing related to the request using the information acquired in the acquisition step; and a call processing result storage step for storing, by the call-processing node, information of a result of the call processing performed in the call processing step in the call processing management database.

Further, a communication control method according to one embodiment of the present invention is a communication control method in a control node in a mobile communication system that provides a mobile communication function to a mobile communication terminal and includes a plurality of call-processing nodes, a call processing management database that is connected to each of the plurality of call-processing nodes and holds data of each mobile communication terminal necessary for call processing, and a control node, the communication control method including: a node state recognition step for recognizing states of the plurality of call-processing nodes; and a control step for determining the call-processing node that processes a call processing request from the mobile communication terminal based on the states of the plurality of call-processing nodes recognized in the node state recognition step, and performing control so that the call processing request is processed by the determined call-processing node.

Further, a communication control method according to one embodiment of the present invention is a communication control method in a call-processing node in a mobile communication system that provides a mobile communication function to a mobile communication terminal and includes a plurality of call-processing nodes, a call processing management database that is connected to each of the plurality of call-processing nodes and holds data of each mobile communication terminal necessary for call processing, and a control node, the communication control method including: a call processing request accepting step for accepting a call processing request controlled by the control node; an acquisition step for acquiring information of the mobile communication terminal related to the call processing request accepted in the call processing request accepting step from the call processing management database; a call processing step for performing call processing related to the request using the information acquired in the acquisition step; and a call processing result storage step for storing information of a result of the call processing performed in the call processing step in the call processing management database.

Further, the present invention may be described not only as the invention of the mobile communication system, the control node, the call-processing node and the communication control method as described above, but also as an invention of a communication system, a control node and a call-processing node included in the communication system, and a communication control method performed by the same, as follows. These are substantially the same inventions as the inventions described above except that the mobile communication terminal is a communication terminal and the mobile communication is communication, and achieve the same operation and effects.

A communication system according to one embodiment of the present invention is a communication system that provides a communication function to a communication terminal and includes a plurality of call-processing nodes, a call processing management database that is connected to each of the plurality of call-processing nodes and holds data of each communication terminal necessary for call processing, and a control node, wherein the control node comprises a node state recognition means that recognizes states of the plurality of call-processing nodes; and a control means that determines the call-processing node that processes a call processing request from the communication terminal based on the states of the plurality of call-processing nodes recognized by the node state recognition means and performs control so that the call processing request is processed by the determined call-processing node, and the call-processing node comprises a call processing request accepting means that accepts a call processing request controlled by the control node; an acquisition means that acquires information of the communication terminal related to the call processing request accepted by the call processing request accepting means from the call processing management database; a call processing means that performs call processing related to the request using the information acquired by the acquisition means; and a call processing result storage means that stores information of a result of the call processing performed by the call processing means in the call processing management database.

A control node according to one embodiment of the present invention is a control node in a communication system that provides a communication function to a communication terminal and includes a plurality of call-processing nodes, a call processing management database that is connected to each of the plurality of call-processing nodes and holds data of each communication terminal necessary for call processing, and the control node, the control node including: a node state recognition means that recognizes states of the plurality of call-processing nodes; and a control means that determines the call-processing node that processes a call processing request from the communication terminal based on the states of the plurality of call-processing nodes recognized by the node state recognition means, and performs control so that the call processing request is processed by the determined call-processing node.

A call-processing node according to one embodiment of the present invention is a call-processing node in a communication system that provides a communication function to a communication terminal and includes a plurality of call-processing nodes, a call processing management database that is connected to each of the plurality of call-processing nodes and holds data of each communication terminal necessary for call processing, and a control node, the call-processing node including: a call processing request accepting means that accepts a call processing request controlled by the control node; an acquisition means that acquires information of the communication terminal related to the call processing request accepted by the call processing request accepting means from the call processing management database; a call processing means that performs call processing related to the request using the information acquired by the acquisition means; and a call processing result storage means that stores information of a result of the call processing performed by the call processing means in the call processing management database.

A communication control method according to one embodiment of the present invention is a communication control method in a communication system that provides a communication function to a communication terminal and includes a plurality of call-processing nodes, a call processing management database that is connected to each of the plurality of call-processing nodes and holds data of each communication terminal necessary for call processing, and a control node, the communication control method including: a node state recognition step for recognizing, by the control node, states of the plurality of call-processing nodes; a control step for determining, by the control node, the call-processing node that processes a call processing request from the communication terminal based on the states of the plurality of call-processing nodes recognized in the node state recognition step, and performing control so that the call processing request is processed by the determined call-processing node; a call processing request accepting step for accepting, by the call-processing node, a call processing request controlled by the control node; an acquisition step for acquiring, by the call-processing node, information of the communication terminal related to the call processing request accepted in the call processing request accepting step from the call processing management database; a call processing step for performing, by the call-processing node, call processing related to the request using the information acquired in the acquisition step; and a call processing result storage step for storing, by the call-processing node, information of a result of the call processing performed in the call processing step in the call processing management database.

A communication control method according to one embodiment of the present invention is a communication control method in a control node in a communication system that provides a communication function to a communication terminal and includes a plurality of call-processing nodes, a call processing management database that is connected to each of the plurality of call-processing nodes and holds data of each communication terminal necessary for call processing, and the control node, the communication control method including: a node state recognition step for recognizing states of the plurality of call-processing nodes; and a control step for determining the call-processing node that processes a call processing request from the communication terminal based on the states of the plurality of call-processing nodes recognized in the node state recognition step, and performing control so that the call processing request is processed by the determined call-processing node.

A communication control method according to one embodiment of the present invention is a communication control method in a call-processing node in a communication system that provides a communication function to a communication terminal and includes a plurality of call-processing nodes, a call processing management database that is connected to each of the plurality of call-processing nodes and holds data of each communication terminal necessary for call processing, and a control node, the communication control method including: a call processing request accepting step for accepting a call processing request controlled by the control node; an acquisition step for acquiring information of the communication terminal related to the call processing request accepted in the call processing request accepting step from the call processing management database; a call processing step for performing call processing related to the request using the information acquired in the acquisition step; and a call processing result storage step for storing information of a result of the call processing performed in the call processing step in the call processing management database.

Advantageous Effects of Invention

In one embodiment of the present invention, since call processing can be executed by any call-processing node without an individual call-processing node being set as the sby system or the act system, it is possible to realize more economical redundancy of the call-processing node. Further, if any call-processing node is operating, it is possible to execute the call processing and thus realize more reliable redundancy of the call-processing node. It is also possible to easily realize the scale-out since an individual call-processing node does not hold the data of each mobile communication terminal (communication terminal) necessary for call processing. Thus, according to one embodiment of the present invention, it is possible to realize the redundancy of the call-processing node having excellent reliability, economic efficiency, and flexibility.

BRIEF DESCRIPTION OF DRAWINGS

FIG. 6 is a sequence diagram illustrating a process (a communication control method) executed when scale-out of the call-processing server is performed in the mobile communication system according to an embodiment of the present invention.

DESCRIPTION OF EMBODIMENTS

Hereinafter, embodiments of a mobile communication system, a control node, a call-processing node and a communication control method according to the present invention will be described in detail with reference to the drawings. Further, the same elements are denoted with the same reference signs in the description of the drawings and repeated description is omitted.

Figure 1:
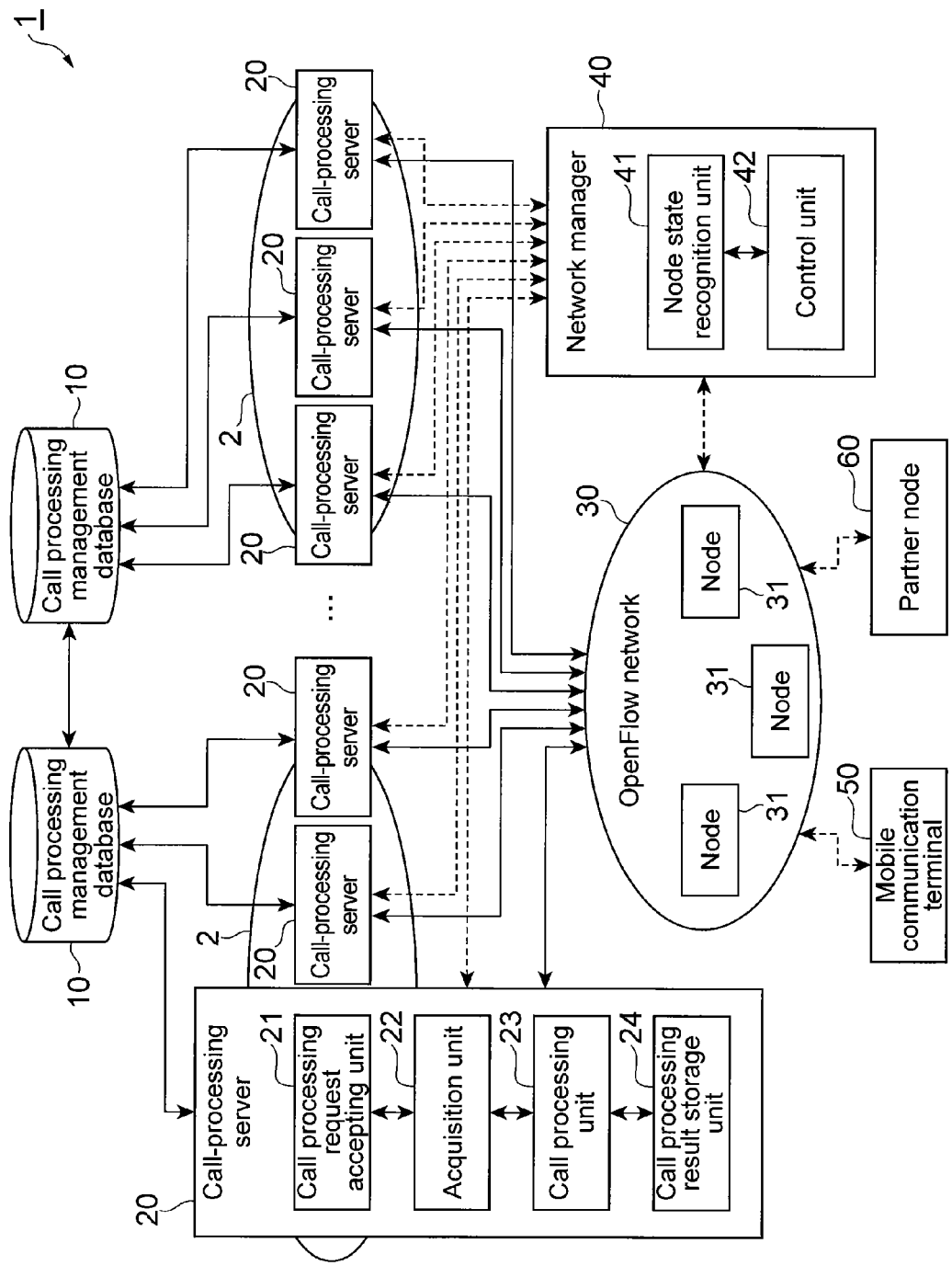
FIG. 1 is a diagram illustrating a configuration of a mobile communication system and a functional configuration of a device constituting the mobile communication system according to an embodiment of the present invention.

A configuration of the mobile communication system 1 according to this embodiment is illustrated in FIG. 1. The mobile communication system 1 is a system which provides a mobile communication function to a mobile communication terminal (mobile device) 50. The mobile communication terminal 50 is a device which is used by a user, is connected to the mobile communication system (mobile communication network) through wireless communication, and performs mobile communication. Specifically, the mobile communication terminal 50 corresponds to a mobile phone or the like. The mobile communication terminal 50, for example, establishes call connection with a partner node 60 via the mobile communication system 1 and performs communication. The partner node 60, for example, corresponds to another mobile communication terminal, a server device which provides various services to the mobile communication terminal 50, a device (e.g., a GGSN (Gateway GPRS Support Node)) for connection to another communications network, or the like. The mobile communication terminal 50 can perform mobile communication by a user of the mobile communication terminal 50 contracting with a communication provider of the mobile communication system 1. In addition, the mobile communication terminal 50 may be similar to a conventional mobile communication terminal.

The mobile communication system 1 includes a call processing management database 10, a plurality of call-processing servers 20, an OpenFlow network 30, and a network manager 40, as illustrated in FIG. 1. In addition, these configurations 10, 20, 30 and 40 constitute a core network of the mobile communication system (mobile communication network) 1.

The call processing management database 10 is a database which holds data necessary for call processing. The call processing management database 10, for example, holds the data in association with information that identifies the mobile communication terminal 50 for each mobile communication terminal 50. Specifically, state information indicating a state of the call processing and a subscriber profile related to the mobile communication terminal 50 is held as the data necessary for call processing. The state information is information indicating an area in which the mobile communication terminal 50 is present and whether the mobile communication terminal 50 is during communication or standby. This information is read and updated (written) by the call-processing server 20, as will be described below.

Further, the data of the subscriber profile includes information such as a phone number, authentication information, a contract speed, and the like of the mobile communication terminal 50. This information is newly stored (generated) as a subscriber profile in the call processing management database 10 when a user of the mobile communication terminal 50 contracts with the communication provider of the mobile communication system 1. The information is read by the call-processing server 20, but is not updated (written) by the call-processing server 20. In addition, the data stored for each mobile communication terminal 50 includes an item of which both reading (Read) and writing (Write) occur and an item of which only reading occurs in this way. Prevention of delay of Read caused by waiting for synchronization of Write can be devised by separately managing records of these items in the call processing management database 10.

The call processing management database 10 is connected to each of the plurality of call-processing servers 20, and reference, registration or update of the data held in the call processing management database 10 is performed by the call-processing server 20. The call processing management database 10 may have any configuration as a database, but in consideration of holding of the data necessary for call processing, may be configured in such a manner that there is no SPOF (Single Point of Failure) as distributed databases realized in the plurality of server devices, as illustrated in FIG. 1.

Here, the call processing is a process related to call connection of the mobile communication terminal 50 and the partner node 60 via the mobile communication system 1. For example, the call processing includes a process of establishing call connection (also referred to as communication session connection) between the mobile communication terminal 50 and the partner node 60 or a process of disconnecting the call connection. In addition, a process for causing the mobile communication terminal 50 to be present in the area of the mobile communication system 1, that is, a position registration process, may be included in the call processing in this embodiment.

Figure 2:
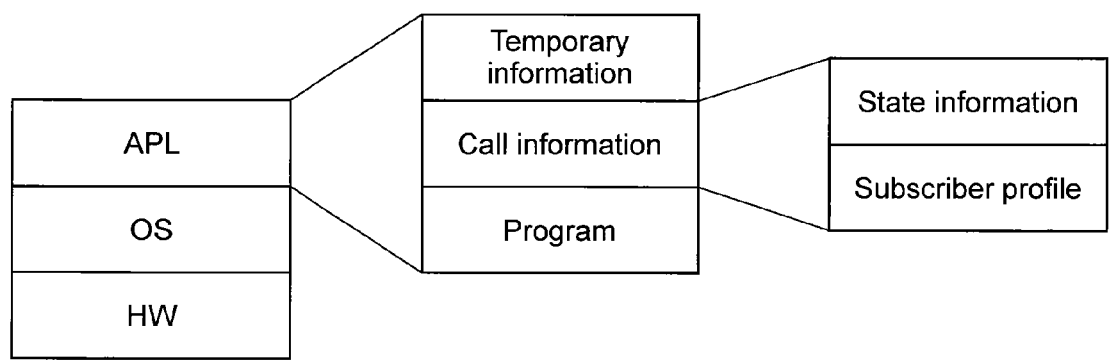
FIG. 2 is a diagram illustrating data held in a call processing management database.

The call-processing server 20 is a call-processing node which performs call processing in the mobile communication system 1. The call-processing server 20 is connected with the mobile communication terminal 50 and the partner node 60 via the OpenFlow network 30, as illustrated in FIG. 1 and performs call processing, for example, in response to a request from the mobile communication terminal 50. The call-processing server 20 is realized by functions of an HW (hardware) layer, an OS (operating system) layer, and an APL (application) layer, as illustrated in FIG. 2. In addition, the call-processing server 20 may be mounted as a virtual server to facilitate a process at the time of a malfunction or scale-out, which will be described below.

In the APL layer, call information, temporary information, and a program are stored in a memory, as illustrated in FIG. 2. The call information is data necessary for call processing and is state information (e.g., information indicating whether during communication or standby) holding state transition of a call, and a subscriber profile. The call information is acquired from the call processing management database 10, and is held only at the time of call processing. In addition, the call information may be held in the call-processing server 20 using a cache for efficiency of the processing after the call processing, but the call-processing server 20 is not responsible for the call information. The temporary information is temporary information (e.g., information during a sequence for position registration, call origination or the like) used during the call processing (signal sequence). For example, the temporary information is temporary information used in a transient state in which a change from a standby status to a communication status occurs. The program is execution code itself (information of an execution binary) for realizing a function of the call-processing server 20.

The plurality of call-processing servers 20 are included in the mobile communication system 1. A plurality of bases (places such as data centers) 2 are provided and one or more call-processing servers 20 are provided in each base 2 in consideration of, for example, the case in which any of the call-processing servers 20 malfunctions due to disaster, as illustrated in FIG. 1. The call-processing server 20 is preferably realized as a virtual server virtualized using a virtual machine technology in a server device. In addition, in this embodiment, while the call-processing node is described as a virtual machine, the call-processing node may be realized as a call-processing server rather than a virtual machine by an individual server device. In a conventional mobile communication system, the call-processing server 20, for example, corresponds to a node such as an SGSN (Serving GPRS Support Node), a CSCF (Call Session Control Function), or an AS (Application Server).

The OpenFlow network 30 is connected with the call-processing server 20, the mobile communication terminal 50 and the partner node 60, and is a flow control network constituting a communication path between these devices. In addition, usually, the OpenFlow network 30 and the mobile communication terminal 50 are connected via a base station (BTS) and a radio network controller (RNC). The OpenFlow network 30 includes a plurality of nodes 31 that are OpenFlow switches connected to one another. The node 31 corresponds to a device usually used as the OpenFlow switch of the OpenFlow network. The OpenFlow network 30 transmits or receives information under control of an OpenFlow controller of the network manager 40, as will be described below. Specifically, each node 31 of the OpenFlow network 30 receives, from the network manager 40, a flow entry indicating a node to which the node 31 transmits received information, and transmits and receives information according to the flow entry. While the OpenFlow network is described in this description, a network known as an SDN (Softwarer defined network) that performs similar flow control and a flow transfer process according to the control may be used. The network manager 40 is a control node which controls transmission and reception of information in the OpenFlow network 30. The control, for example, is performed by an OpenFlow controller which performs load balancing control included in the network manager 40. The control to be performed specifically will be described below. The network manager 40 is connected to each of the call-processing servers 20 such that the network manager 40 can transmit or receive information.

Next, functions according to this embodiment of the network manager 40 and the call-processing server 20 will be described in greater detail. The network manager 40 comprises a node state recognition unit 41 and a control unit 42, as illustrated in FIG. 1. In addition, when the call-processing server is virtualized and consists of a virtual machine, the network manager 40 may further comprise a virtual machine control unit (not illustrated) which performs control of the virtualized call-processing server (virtual call-processing server). Through this control, specifically, provisioning of the virtual call-processing server is performed.

The node state recognition unit 41 is a node state recognition means that recognizes a state of the plurality of call-processing servers 20. First, the node state recognition unit 41 recognizes an existing call-processing server 20. This, for example, is performed by receiving information indicating new installation from the call-processing server 20 when the call-processing server 20 is newly installed due to scale-out or the like. In addition, the node state recognition unit 41 recognizes, as a state of the call-processing server 20, information on a load of each server or on whether or not a malfunction occurs. The information, for example, is recognized in the node state recognition unit 41 by reception of the information from the call-processing server 20 based on a periodical inquiry from the node state recognition unit 41 or voluntary transmission from the node state recognition unit 41. The node state recognition unit 41 outputs information indicating the recognized state of each call-processing server 20 to the control unit 42.

The control unit 42 is a control means which determines (assigns) the call-processing server 20 to process a call processing request from the mobile communication terminal 50 based on a state of each of the plurality of call-processing servers 20 recognized by the node state recognition unit 41, and performs control so that the call processing request is processed by the determined call-processing server 20. Specifically, the control unit 42 configures the OpenFlow network 30 so that the call processing request is processed by the determined call-processing server 20.

The control unit 42 determines the call-processing server 20 controlling the call processing based on the state of each call-processing server 20. For example, the call-processing server 20 processing the call processing is determined so that the malfunctioning call-processing server 20 or the call-processing server 20 to which a processing load equal to or more than a certain threshold is applied is not the call-processing server 20 processing the call processing. Further, the call-processing server 20 processing the call processing may be determined so that the processing load becomes as uniform as possible among the call-processing servers 20. Further, the call-processing server 20 performing the call processing may be determined according to the mobile communication terminal 50. For example, the communication provider of the mobile communication system 1 stores, in the control unit 42, a criterion (implementation scenario) for determination of the call-processing server 20 processing the call processing in advance.

The control unit 42 generates a flow entry so that the call processing request from the mobile communication terminal 50 is transmitted to the determined call-processing server 20, and transmits the generated flow entry to each node 31 of the OpenFlow network 30.

The determination of the call-processing server 20 processing the call processing and the generation of the flow entry, for example, may be performed at every certain period of time (e.g., at every specific time) or when the state of the call-processing server 20 changes (e.g., when the call-processing server 20 stops due to malfunction, processing congestion, maintenance, or the like).

The virtual machine control unit is a virtualization control means which controls virtualization based on the state of each of the plurality of call-processing servers 20 recognized by the node state recognition unit 41 when the call-processing server is virtualized. This is, for example, control to cause the virtual call-processing server 20 to be newly provisioned by the virtual machine control unit sending an instruction to a hypervisor when the call-processing server 20 is desired to be added for scale-out according to the state of each call-processing server 20. Accordingly, appropriate virtualization can be performed according to the state of the call-processing server 20. More specifically, a more appropriate scale-out process or a more appropriate process upon malfunction can be realized by controlling provisioning of the virtual machine in the virtual machine control unit in an integrated manner (by turning processes).

The call-processing server 20 comprises a call processing request accepting unit 21, an acquisition unit 22, a call processing unit 23, and a call processing result storage unit 24.

The call processing request accepting unit 21 is a call processing request accepting means that accepts (receives) a call processing request transmitted from the OpenFlow network 30 to the own node 20 under control of the network manager 40. The call processing request is a call origination request (a call connection establishment request) or a position registration request. The call processing request accepting unit 21 outputs the received call processing request to the acquisition unit 22 and the call processing unit 23.

The acquisition unit 22 is an acquisition means that acquires, from the call processing management database 10, information of the mobile communication terminal 50 related to the call processing request accepted by the call processing request accepting unit 21. The acquisition unit 22 extracts information that identifies the mobile communication terminal 50 that is a call processing request source, which is included in the call processing request, and requests the call processing management database 10 to transmit the information related to the mobile communication terminal 50. The information requested here is call information illustrated in FIG. 2, and is, specifically, a phone number, authentication information, a contract speed, an area in which the mobile communication terminal 50 is present, and information indicating whether during communication or standby, as described above. In addition, when call processing related to the mobile communication terminal 50 is performed in the own node 20 and a cache of valid call information remains in the own node 20, the acquisition by the acquisition unit 22 may not be performed if the last update time of the cache is not earlier than the last update time of the call processing management database 10. The acquisition unit 22 outputs the information acquired from the call processing management database 10 to the call processing unit 23.

The call processing unit 23 is a call processing means that performs the call processing related to the request using the information acquired by the acquisition unit 22. Specifically, a call connection establishment or disconnection process or a position registration process (a process of registering or updating the area in which the mobile communication terminal 50 is present) is performed. The call processing unit 23 outputs information of a result of the call processing to the call processing result storage unit 24.

The call processing result storage unit 24 is a call processing result storage means that stores information of a result of the call processing performed by the call processing unit 23 in the call processing management database 10. Specifically, the call processing result storage unit 24 is information on the area in which the mobile communication terminal 50 is present or on whether the mobile communication terminal 50 is during communication or standby, which is updated through the call processing. The information is information necessary for next call processing related to the mobile communication terminal 50. The storage of the information in the call processing management database 10 by the call processing result storage unit 24 may be performed only when a change occurs in the call information (state information). When the storage of the information in the call processing management database 10 by the call processing result storage unit 24 is performed, the last update time is updated with a current time. These are functions related to this embodiment of the network manager 40 and the call-processing server 20.

Figure 3:
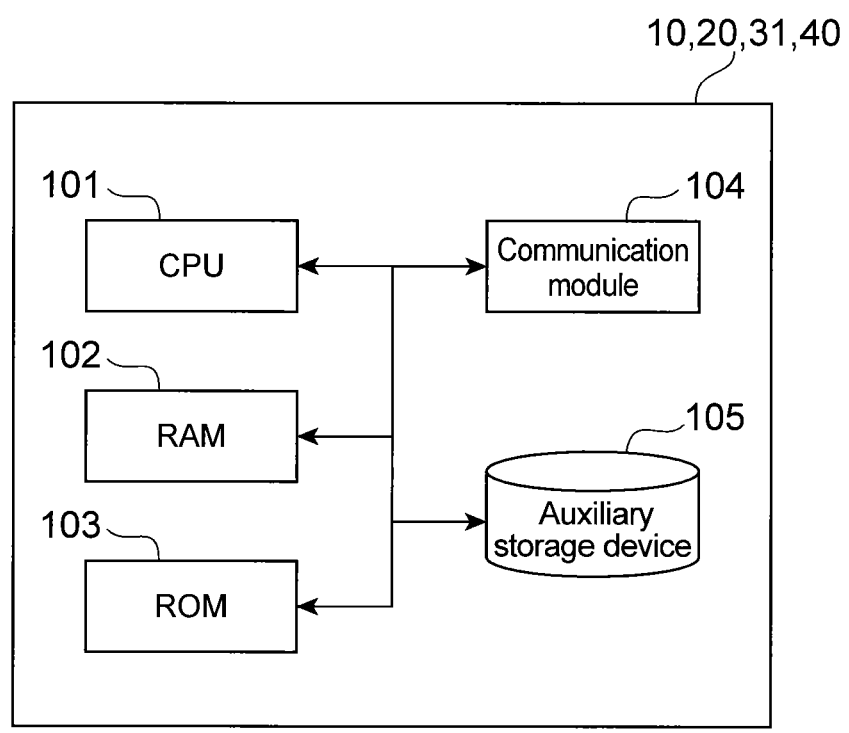
FIG. 3 is a diagram illustrating a hardware configuration of a device constituting the mobile communication system according to the embodiment of the present invention.

A hardware configuration of a server device constituting the call processing management database 10, the call-processing server 20, the nodes 31 of the OpenFlow network 30, and the network manager 40 according to this embodiment is illustrated in FIG. 3. The server device includes a computer including hardware such as a CPU 101, a RAM (Random Access Memory) 102 and a ROM (Read Only Memory) 103 constituting a main storage device, a communication module 104 for performing communication, and an auxiliary storage device 105 such as a hard disk, as illustrated in FIG. 3. The function of each of the nodes 10, 20, 31 and 40 described above is exhibited by these components operating with a program or the like. This configuration is a configuration of the mobile communication system 1.

Figure 4:
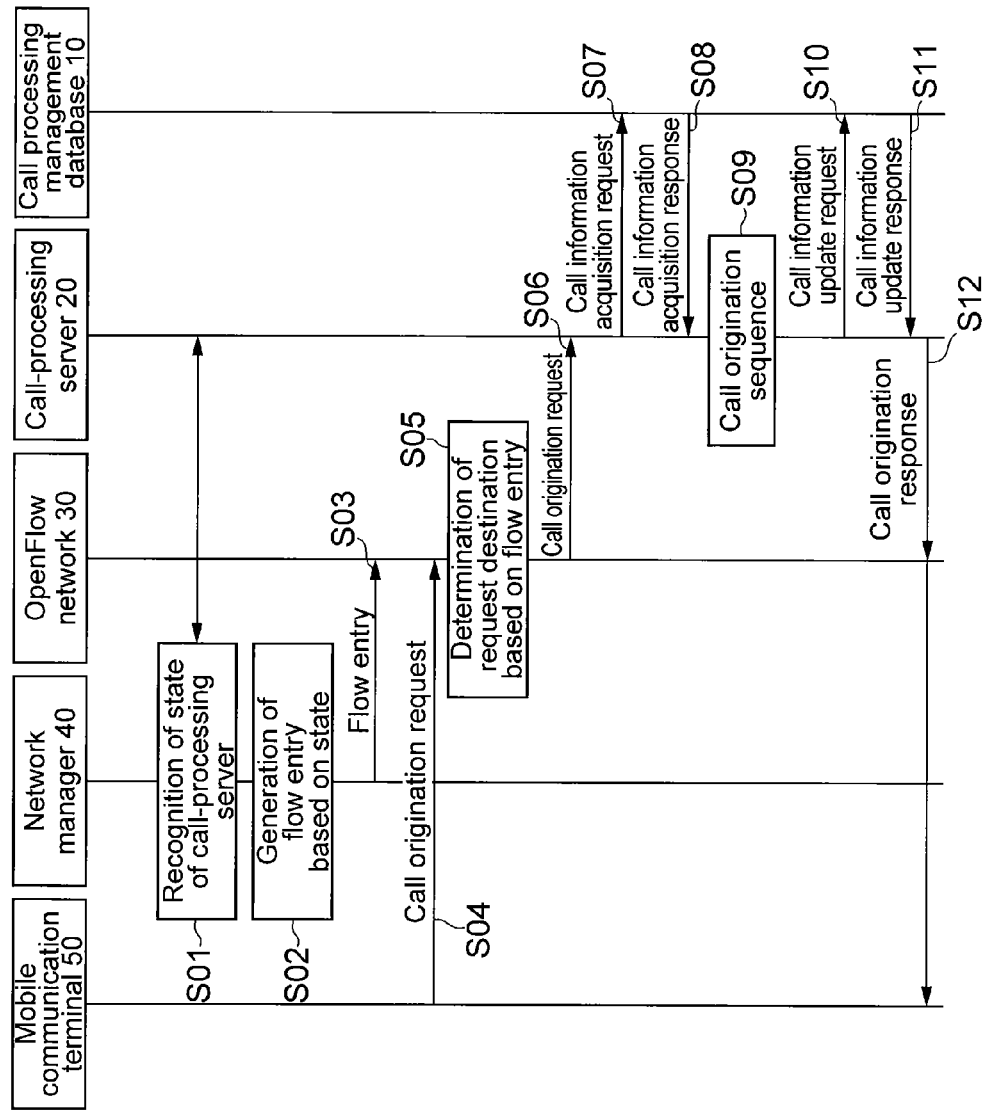
FIG. 4 is a sequence diagram illustrating a process (communication control method) executed in normal time in the mobile communication system according to the embodiment of the present invention.
Figure 5:
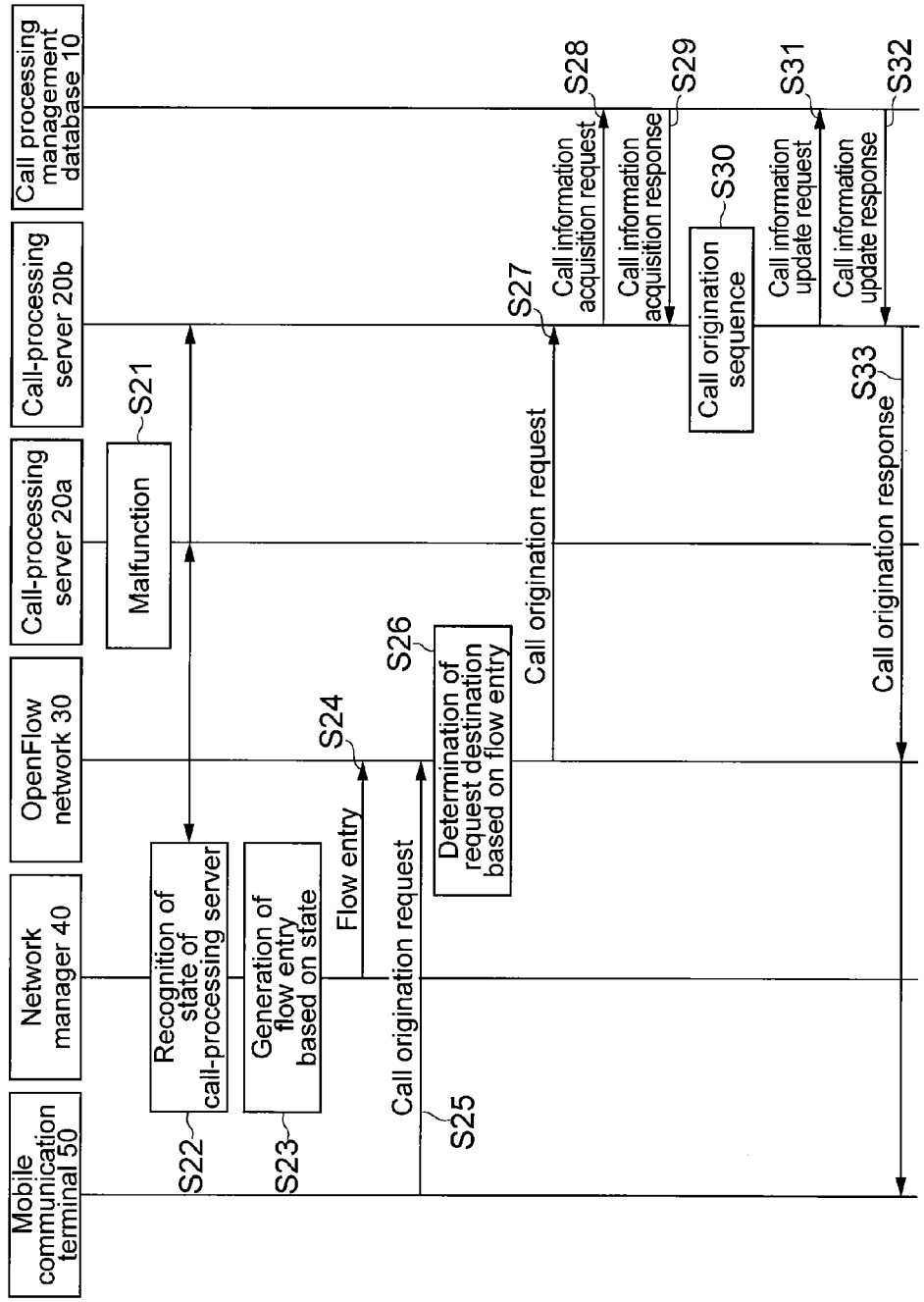
FIG. 5 is a sequence diagram illustrating a process (a communication control method) executed when a call-processing server malfunctions in the mobile communication system according to the embodiment of the present invention.

Next, a communication control method that is a process executed in the mobile communication system 1 according to this embodiment will be described using sequence diagrams of FIGS. 4 to 6. First, a process when call origination from the mobile communication terminal 50 to another terminal is performed in a normal state will be described using the sequence diagram in FIG. 4.

In the mobile communication system 1, the recognition of the state of each call-processing server 20 is performed by the node state recognition unit 41 of the network manager 40 (S01: node state recognition step). The information indicating the state of each call-processing server 20 is output from the node state recognition unit 41 to the control unit 42. The call-processing server 20 performing the call processing is then determined by the control unit 42 based on the information indicating the state of each call-processing server 20, and a flow entry is generated so that a call processing request is transmitted to the determined call-processing server 20 (S02: control step). The generated flow entry is transmitted to each node 31 of the OpenFlow network 30 (S03: control step). In each node 31 of the OpenFlow network 30, the flow entry is received, and transmission of the flow (a signal such as a call processing request) is performed based on the flow entry.

Here, a call origination request is performed from the mobile communication terminal 50 to the mobile communication system (mobile communication network) 1 (S04). The call origination request is a request of call connection for performing communication with another terminal. The call origination request is received by a predetermined node 31 (the node 31 connected with the mobile communication terminal 50) of the OpenFlow network 30. The call-processing server 20 of a request destination (transmission destination) is determined based on the flow entry by the predetermined node 31 of the OpenFlow network 30 (S05; control step). The call origination request is then transmitted from the node 31 to the call-processing server 20 (S06; control step).

In the call-processing server 20 to which the call origination request has been transmitted, the call origination request is received by the call processing request accepting unit 21 (S06; call processing request accepting step). Information of the call origination request received by the call processing request accepting unit 21 is output to the acquisition unit 22 and the call processing unit 23. The call-processing server 20 does not hold data of the mobile communication terminal 50 necessary for call processing, that is, call information including state information indicating a state of the call processing and a subscriber profile related to the mobile communication terminal 50.

A call information acquisition request to request the call processing management database 10 to provide the call information related to the mobile communication terminal 50 that has made the call origination request is then performed from the acquisition unit 22 (S07; acquisition step). In the call processing management database 10, the call information acquisition request is received. The call information related to the mobile communication terminal 50 is then read and transmitted as a call information acquisition response from the call processing management database 10 to the call-processing server 20. In the call-processing server 20, the call information is received by the acquisition unit 22 (S08; acquisition step). The call information acquired here is call information including information indicating a standby status. Here, the call-processing server 20 holds the call information including the state information indicating a state of the call processing and the subscriber profile related to the mobile communication terminal 50. The received call information is output from the acquisition unit 22 to the call processing unit 23.

The call processing related to the call origination request is then executed by the call processing unit 23 based on the call information acquired by the acquisition unit 22 (S09; call processing step). The call processing here is a call origination process for establishing call connection, and is performed according to a call origination sequence for establishing call connection with the other server. When the call connection is established through the call processing in the call processing unit 23, the mobile communication terminal 50 is communicating, and the communication state of the mobile communication terminal 50 included in the call information transitions to a communication state. Information of a result of the call processing performed by the call processing unit 23 (call information in which the state transitions to the communication state) is output from the call processing unit 23 to the call processing result storage unit 24.

The call information on which the result of the call processing has been reflected is then transmitted as a call information update request from the call processing result storage unit 24 to the call processing management database 10 (S10; call processing result storage step). In the call processing management database 10, the call information update request is received and the information related to the mobile communication terminal 50 is updated with the received information. In other words, the call information after the update includes the information indicating communicating. If the update is performed, a call information update response is transmitted from the call processing management database 10 to the call-processing server 20 (S11). In the call-processing server 20, when the call information update response is received, a call origination response is transmitted to the mobile communication terminal 50 that has performed the call origination request over the OpenFlow network 30 (S12).

This is a process when the call origination is performed. While this is a process at the time of call origination, the process is similarly performed for other call processing. For example, when the mobile communication terminal 50 performs position registration, the call-processing server 20 that has received the position registration request acquires the call information indicating that the mobile communication terminal 50 is present outside the service area or inside another position registration area through a process corresponding to S07 and S08 of FIG. 1. Also, a position registration process is performed through a process corresponding to S09. Also, call information after the update related to the mobile communication terminal 50, which includes a position registration area after the position registration (or after the update) and information indicating a standby status, is stored in the call processing management database 10 through a process corresponding to S10 and S11. Further, a similar process is applicable when there has been a request for call connection from a partner device.

Next, processing in a case in which call origination is performed from the mobile communication terminal 50 to another terminal when a call-processing server 20a malfunctions will be described using a sequence diagram of FIG. 5. In addition, the call-processing server 20a performs the call processing of the mobile communication terminal 50 before the call-processing server 20a malfunctions.

First, the call-processing server 20a malfunctions (S21). In the mobile communication system 1, recognition of the state of each call-processing server 20 is performed by the node state recognition unit 41 of the network manager 40 (S22; node state recognition step). In this case, malfunction of the call-processing server 20a is also recognized by the node state recognition unit 41. In addition, when the call-processing server 20*a* malfunctions while performing signal processing, call information stored in the call processing management database 10 is discarded (rollback) and rewriting of the call processing management database 10 is not performed. Further, when communication established by the call-processing server 20*a* is being performed, information indicating communicating is saved since the information is managed in the call processing management database 10. Information indicating the state of each call-processing server 20 is output from the node state recognition unit 41 to the control unit 42.

The call-processing server 20 performing the call processing is then determined by the control unit 42 based on the information indicating the state of each call-processing server 20, and a flow entry is generated so that a call processing request is transmitted to the determined call-processing server 20 (S23; control step). Since the call-processing server 20*a* malfunctions, the flow entry generated here is such that the call-processing server 20 performing the call processing is a call-processing server 20 other than the call-processing server 20*a*. For example, the call-processing server 20*b* is set to execute the call processing that was being executed by the call-processing server 20*a* and the flow entry is generated.

When the call-processing server 20 has been virtualized, a virtual call-processing server newly provisioned by the virtual machine control unit of the network manager 40 according to the state of the call-processing server 20 may become the call-processing server 20*b*.

The generated flow entry is transmitted to each node 31 of the OpenFlow network 30 (S24; control step). In each node 31 of the OpenFlow network 30, the flow entry is received, and transmission of a flow (signal for a call processing request or the like) is performed based on the flow entry.

Here, a call origination request is performed from the mobile communication terminal 50 to the mobile communication system (mobile communication network) 1 (S25). The call origination request is a request for call connection for performing communication with another terminal. The call origination request is received by a predetermined node 31 (the node 31 connected with the mobile communication terminal 50) of the OpenFlow network 30. The call-processing server 20*b* of a request destination (a transmission destination) is determined based on the flow entry by the predetermined node 31 of the OpenFlow network 30 (S26; control step). In addition, a path is changed as described above by the OpenFlow network 30 even when an IP address that is information indicating a transmission destination of the call origination request transmitted from the mobile communication terminal 50 indicates the call-processing server 20*a* that has performed the call processing so far. Switching of the call-processing server 20 may be realized, for example, by setting a flow entry selecting the call-processing server 20 of a connection destination in each address band of SrcIP (IP address of the data transmission source) of the mobile communication terminal 50. Further, the newly assigned call-processing server 20*b* secures arrival of a signal by taking over the IP address of the call-processing server 20*a*. Through such switching of the transmission destination, the switching of the call-processing server 20 can be performed without being aware of the call-processing server 20 performing the call processing (without changing settings for communication between applications) on the mobile communication terminal 50 side. The call origination request is then transmitted from the node 31 to the call-processing server 20*b* (S27; control step).

In the call-processing server 20*b* to which the call origination request has been transmitted, the call origination request is received by the call processing request accepting unit 21 (S27; call processing request accepting step). Information of the call origination request received by the call processing request accepting unit 21 is output to the acquisition unit 22 and the call processing unit 23. The call-processing server 20 does not hold data of the mobile communication terminal 50 necessary for call processing, that is, state information indicating a state of the call processing and call information including a subscriber profile related to the mobile communication terminal 50.

A call information acquisition request to request the call processing management database 10 to provide the call information related to the mobile communication terminal 50 that has made the call origination request is then performed from the acquisition unit 22 (S28; acquisition step). In the call processing management database 10, the call information acquisition request is received. The call information related to the mobile communication terminal 50 is then read and transmitted as a call information acquisition response from the call processing management database 10 to the call-processing server 20*b*. In the call-processing server 20*b*, the call information is received by the acquisition unit 22 (provisioning) (S29; acquisition step). The call information acquired here is call information including the information indicating a standby status. Here, the call-processing server 20*b* holds the call information including the state information indicating a state of the call processing (last written by 20*a* that has performed the call processing) and the subscriber profile related to the mobile communication terminal 50. The received call information is output from the acquisition unit 22 to the call processing unit 23.

The call processing related to the call origination request is then executed by the call processing unit 23 based on the call information acquired by the acquisition unit 22 (S30; call processing step). The call processing here is a call origination process for establishing call connection, and is performed according to a call origination sequence for establishing call connection with another server. When the call connection is established through the call processing in the call processing unit 23, the mobile communication terminal 50 is communicating, and the communication state of the mobile communication terminal 50 included in the call information transitions to a communication state. Information of a result of the call processing performed by the call processing unit 23 (call information in which the state transitions to the communication state) is output from the call processing unit 23 to the call processing result storage unit 24.

The call information on which the result of the call processing has been reflected is then transmitted as a call information update request from the call processing result storage unit 24 to the call processing management database 10 (S31; call processing result storage step). In the call processing management database 10, the call information update request is received and the information related to the mobile communication terminal 50 is updated with the received information. In other words, the call information after the update includes the information indicating communicating. If the update is performed, a call information update response is transmitted from the call processing management database 10 to the call-processing server 20*b* (S32). In the call-processing server 20*b*, when the call information update response is received, a call origination response is transmitted to the mobile communication terminal 50 that has performed the call origination request over the OpenFlow network 30 (S33). This is processing in a case in which call origination is performed when the call-processing server 20a malfunctions.

Next, processing in a case in which call origination is performed from the mobile communication terminal 50 to another terminal when the call-processing server 20b is added and scaled out will be described using a sequence diagram of FIG. 6. In addition, the call-processing server 20a performs the call processing of a mobile communication terminal 50a and a mobile communication terminal 50b before the call-processing server 20b is added.

First, the call-processing server 20b is added (S41). This addition, for example, is performed by a communication provider of the mobile communication system 1. In the mobile communication system 1, recognition of the state of each call-processing server 20 is performed by the node state recognition unit 41 of the network manager 40 (S42; node state recognition step). In this case, the addition of the call-processing server 20b is also recognized by the node state recognition unit 41. The information indicating the state of each call-processing server 20 is output from the node state recognition unit 41 to the control unit 42.

When the call-processing server 20 is virtualized, S41 may be the following process. In other words, for example, the node state recognition unit 41 recognizes a lack of processing capacity of the call-processing server 20a due to congestion or the like, and notifies the control unit 42 thereof. The control unit 42 instructs the virtual machine control unit to add the call-processing server 20. In the virtual machine control unit, the call-processing server 20b is newly provisioned.

The call-processing server 20 performing the call processing is then determined by the control unit 42 based on the information indicating the state of each call-processing server 20, and a flow entry is generated so that a call processing request is transmitted to the determined call-processing server 20 (S43; control step). Since the call-processing server 20b is newly added, the flow entry generated here includes the newly added call-processing server 20b as the call-processing server 20 performing the call processing. For example, the call processing related to the mobile communication terminal 50a is set to be executed by the call-processing server 20a, the call processing related to the mobile communication terminal 50b is set to be executed by the call-processing server 20b, and the flow entry is generated.

The generated flow entry is transmitted to each node 31 of the OpenFlow network 30 (S44; control step). In each node 31 of the OpenFlow network 30, the flow entry is received and transmission of a flow (signal for a call processing request or the like) is performed based on the flow entry.

Here, a call origination request is performed from the mobile communication terminal 50a to the mobile communication system (mobile communication network) 1 (S45). The call origination request is a request for call connection for performing communication with another terminal. The call origination request is received by a predetermined node 31 (the node 31 connected to the mobile communication terminal 50a) of the OpenFlow network 30. The call-processing server 20a of a request destination (a transmission destination) is determined based on the flow entry by the predetermined node 31 of the OpenFlow network 30 (S46; control step). The call origination request is then transmitted from the node 31 to the call-processing server 20b (S47; control step). Further, since the call processing related to the mobile communication terminal 50a is the same as those illustrated in FIGS. 4 and 5, illustration and description are omitted.

Meanwhile, a call origination request is performed from the mobile communication terminal 50b to the mobile communication system (mobile communication network) 1 (S48). The call origination request is a request for call connection for performing communication with another terminal. The call origination request is received by a predetermined node 31 (the node 31 connected to the mobile communication terminal 50b) of the OpenFlow network 30. The call-processing server 20b of a request destination (a transmission destination) is determined based on the flow entry by the predetermined node 31 of the OpenFlow network 30 (S49, control step). Further, a path is changed as described above by the OpenFlow network 30 even when an IP address that is information indicating the transmission destination of the call origination request transmitted from the mobile communication terminal 50b is the call-processing server 20a that has performed the call processing so far. Switching of the call-processing server 20 can be realized, for example, by setting a flow entry selecting the call-processing server 20 of a connection destination in each address band of SrcIP (an IP address of a data transmission source) of the mobile communication terminal 50. In addition, the newly assigned call-processing server 20b secures arrival of the signal by taking over an IP address of the call-processing server 20a. Through such switching of the transmission destination, adding the call-processing server 20 can be performed to improve performance without being aware of the call-processing server 20 performing the call processing (without changing, for example, settings for communication between applications) on the mobile communication terminal 50 side. The call origination request is then transmitted from the node 31 to the call-processing server 20b (S50; control step).

In the call-processing server 20b to which the call origination request has been transmitted, the call origination request is received by the call processing request accepting unit 21 (S50; call processing request accepting step). Information of the call origination request received by the call processing request accepting unit 21 is output to the acquisition unit 22 and the call processing unit 23. The call-processing server 20 does not hold data of the mobile communication terminal 50b necessary for call processing, that is, call information including state information indicating a state of the call processing and subscriber profile related to the mobile communication terminal 50b.

A call information acquisition request to request the call processing management database 10 to provide the call information related to the mobile communication terminal 50b that has performed the call origination request is then performed from the acquisition unit 22 (S51; acquisition step). In the call processing management database 10, the call information acquisition request is received. The call information related to the mobile communication terminal 50b is then read and transmitted as a call information acquisition response from the call processing management database 10 to the call-processing server 20b. In the call-processing server 20b, the call information is received by the acquisition unit 22 (S52; acquisition step). The call information acquired here is call information including information indicating a standby status. Here, the call-processing server 20b holds the call information including state information indicating a state of the call processing and a subscriber profile related to the mobile communication terminal 50*b*. The received call information is output from the acquisition unit 22 to the call processing unit 23.

The call processing related to the call origination request is then executed by the call processing unit 23 based on the call information acquired by the acquisition unit 22 (S53; call processing step). The call processing here is a call origination process for establishing call connection, and is performed according to a call origination sequence for establishing call connection with the other server. When the call connection is established through the call processing in the call processing unit 23, the mobile communication terminal 50*b* is communicating, and the communication state of the mobile communication terminal 50*b* included in the call information transitions to a communication state. Information of a result of the call processing performed by the call processing unit 23 (call information in which the state transitions to the communication state) is output from the call processing unit 23 to the call processing result storage unit 24.

The call information on which the result of the call processing has been reflected is then transmitted as a call information update request from the call processing result storage unit 24 to the call processing management database 10 (S54; call processing result storage step). In the call processing management database 10, the call information update request is received and the information related to the mobile communication terminal 50*b* is updated with the received information. In other words, the call information after the update includes information indicating communicating. If the update is performed, a call information update response is transmitted from the call processing management database 10 to the call-processing server 20*b* (S55). In the call-processing server 20*b*, when the call information update response is received, a call origination response is transmitted to the mobile communication terminal 50*b* that has performed the call origination request over the OpenFlow network 30 (S56). This is processing in a case in which call origination is performed when the call-processing server 20*b* is added and scaled out.

As described above, in the mobile communication system 1 according to this embodiment, data of each mobile communication terminal 50 necessary for call processing is held in the call processing management database 10 having a separate configuration from the call-processing server 20 which is a call-processing node, and the information is referred to each time call processing is performed, and newly stored. Therefore, in this mobile communication system 1, call processing related to any mobile communication terminal 50 may be executed by any call-processing server 20. Also, in this mobile communication system 1, the call processing may be performed in the call-processing server 20 determined by the network manager 40 for each call processing request instead of determining the call-processing node that will perform the call processing for each mobile communication terminal 50.

In addition, in a conventional mobile communication system, once a call-processing server performing call processing of a mobile communication terminal is determined through the process of causing the mobile communication terminal to be present in a service area, state information that is information necessary for call processing in the mobile communication terminal is held in the call-processing server, and thus the call processing cannot be performed by another call-processing server. Therefore, in the conventional mobile communication system, redundancy in which the call-processing server has an act/sby configuration as described above is sought.

As described above, in the present mobile communication system 1, since the call processing is executed by any call-processing server 20 without the individual call-processing server 20 being set as an sby system or an act system, more economical redundancy of the call-processing node can be realized. Further, if any call-processing server 20 is operating, the call processing can be performed and thus more reliable redundancy of the call-processing server 20 can be realized. Furthermore, it is possible to easily realize the scale-out since the individual call-processing servers 20 do not hold data of each mobile communication terminal 50 necessary for call processing.

More specifically, the individual call-processing server 20 can be switched when the call-processing server 20 malfunctions as described above. Further, the call-processing server 20 can be easily switched at the time of not only malfunction (sudden stop) of the call-processing server 20 but also a planned stop. It is also possible to easily move users to the added call-processing server 20 without being triggered by the position registration process when the call-processing server 20 is scaled out. In the conventional mobile communication system, since it is difficult to move the mobile communication terminal already present in the service area to another call-processing server as described above, it is possible only to move a user gradually even when the call-processing server is added. Thus, according to the present mobile communication system 1, it is possible to realize redundancy of the call-processing node having excellent reliability, economic efficiency, and flexibility.

Further, the OpenFlow network may be used as in the present embodiment. In accordance with this configuration, since the call-processing server 20 is not associated with the position registration area, it is possible to realize redundancy of the call-processing server 20 which does not depend on the position registration area. Thus, the above effects of the present invention can increase. However, the present invention can be implemented in an aspect in which the call-processing server is associated with the position registration area. In this case, it is possible to realize the redundancy of the call-processing server having excellent reliability, economic efficiency and flexibility in the position registration area.

While the case in which the present invention is the mobile communication system which provides the mobile communication function to the mobile communication terminal has been described in the embodiment described above, the present invention is not necessarily the mobile communication system. The present invention is applicable to a fixed communication system which provides a fixed communication function to a fixed communication terminal. The fixed communication terminal and the fixed communication system are connected by a cable, unlike the mobile communication system described above. The embodiment described above may be caused to be an embodiment of the fixed communication system according to the present invention by replacing the mobile communication terminal with a fixed communication terminal, the mobile communication with fixed communication and the mobile communication system with a fixed communication system. However, in this case, a specific node corresponds to the fixed communication system. Further, information specific to the mobile communication such as the service area in which the terminal is present in the embodiment described above is unnecessary in the fixed communication system. In addition, the present invention may be implemented in a communication system in which the mobile communication and the fixed communication are both present.

In other words, the present invention is not limited to the mobile communication terminal, the mobile communication and the mobile communication system, and is applicable to any communication terminal, any communication and any communication system as long as these have the same framework as the embodiments described above.

REFERENCE SIGNS LIST

1 . . . Mobile communication system, 2 . . . Base, 10 . . . Call processing management database, 20 . . . Call-processing server, 21 . . . Call processing request accepting unit, 22 . . . Acquisition unit, 23 . . . Call processing unit, 24 . . . Call processing result storage unit, 30 . . . OpenFlow network, 31 . . . Node, 40 . . . Network manager, 41 . . . Node state recognition unit, 42 . . . Control unit, 50 . . . Mobile communication terminal, 60 . . . Partner node, 101 . . . CPU, 102 . . . RAM, 103 . . . ROM, 104 . . . Communication module, 105 . . . Auxiliary storage device.

The invention claimed is:

1. A mobile communication system that provides a mobile communication function to a mobile communication terminal and includes a plurality of call-processing nodes, a call processing management database that is communicatively coupled with each of the plurality of call-processing nodes via a communication path and holds data of each mobile communication terminal necessary for call processing, and a control node, wherein
the control node comprises circuitry configured to
recognize states of the plurality of call-processing nodes;
select a call-processing node among the plurality of call-processing nodes for processing a call processing request from the mobile communication terminal based on the states of the plurality of call-processing nodes; and
perform control so that the call processing request is directed to the selected call-processing node, and
at least one call-processing node of the plurality of call-processing nodes comprises circuitry configured to
receive the call processing request or one or more other call processing requests as directed by the control node;
acquire information of a corresponding mobile communication terminal related to the received call processing request from the call processing management database, each time a processing request is received or each time a processing request is received and the at least one call-processing node does not have valid information of the corresponding mobile communication terminal related to the received call processing request, the information comprising state information indicating whether the corresponding mobile communication terminal is in communication or at standby;
perform call processing related to the received call processing request using the information; and
store information of a result of the call processing in the call processing management database.

2. The mobile communication system according to claim 1, further comprising a flow control network,
wherein the control node configures the flow control network so that the call processing request is directed to the selected call-processing node.

3. The mobile communication system according to claim 1, wherein the at least one call-processing node is a virtualized virtual machine in a server device, and
the control node further controls virtualization performed by the server device based on the states of the plurality of call-processing nodes.

4. A call-processing node in a mobile communication system that provides a mobile communication function to a mobile communication terminal and includes a plurality of call-processing nodes, a call processing management database that is communicatively coupled with each of the plurality of call-processing nodes via a communication path and holds data of each mobile communication terminal necessary for call processing, and a control node, the call-processing node comprising:
circuitry configured to
receive one or more call processing requests as directed by the control node;
acquire information of a corresponding mobile communication terminal related to the received call processing request from the call processing management database, each time a processing request is received or each time a processing request is received and the call-processing node does not have valid information of the corresponding mobile communication terminal related to the received call processing request, the information comprising state information indicating whether the corresponding mobile communication terminal is in communication or at standby;
perform call processing related to the received call processing request using the information; and
store information of a result of the call processing in the call processing management database.

5. A communication control method in a mobile communication system that provides a mobile communication function to a mobile communication terminal and includes a plurality of call-processing nodes, a call processing management database that is communicatively coupled with each of the plurality of call-processing nodes via a communication path and holds data of each mobile communication terminal necessary for call processing, and a control node, the communication control method comprising:
recognizing, by the control node, states of the plurality of call-processing nodes;
selecting, by the control node, a call-processing node among the plurality of call-processing nodes for processing a call processing request from the mobile communication terminal based on the states of the plurality of call-processing nodes;
performing control so that the call processing request is directed to the selected call-processing node;
receiving, by at least one call-processing node of the plurality of call-processing nodes, the call processing request or one or more other call processing requests as directed by the control node;
acquiring, by the call-processing node, information of a corresponding mobile communication terminal related to the received call processing request from the call processing management database, each time a processing request is received or each time a processing request is received and the call-processing node does not have valid information of the corresponding mobile communication terminal related to the received call processing request, the information comprising state information indicating whether the corresponding mobile communication terminal is in communication or at standby;

performing, by the call-processing node, call processing
related to the received call processing request using the
information acquired in the acquiring; and
storing, by the call-processing node, information of a
result of the call processing performed in the performing in the call processing management database.

6. A communication control method in a call-processing node in a mobile communication system that provides a mobile communication function to a mobile communication terminal and includes a plurality of call-processing nodes, a call processing management database that is communicatively coupled with each of the plurality of call-processing nodes via a communication path and holds data of each mobile communication terminal necessary for call processing, and a control node, the communication control method comprising:
 receiving one or more call processing requests as directed by the control node;
 acquiring information of a corresponding mobile communication terminal related to the received call processing request from the call processing management database, each time a processing request is received or each time a processing request is received and the call-processing node does not have valid information of the corresponding mobile communication terminal related to the received call processing request, the information comprising state information indicating whether the corresponding mobile communication terminal is in communication or at standby;
 performing call processing related to the received call processing request using the information acquired in the acquiring; and
 storing information of a result of the call processing performed in the performing in the call processing management database.

7. A communication system that provides a communication function to a communication terminal and includes a plurality of call-processing nodes, a call processing management database that is communicatively coupled with each of the plurality of call-processing nodes via a communication path and holds data of each communication terminal necessary for call processing, and a control node,
 wherein the control node comprises circuitry configured to
  recognize states of the plurality of call-processing nodes;
  selecting a call-processing node among the plurality of call-processing nodes for processing a call processing request from the communication terminal based on the states of the plurality of call-processing nodes; and
  perform control so that the call processing request is directed to the selected call-processing node, and
 the call-processing node comprises circuitry configured to
  receive the call processing request or one or more other call processing requests as directed by the control node;
  acquire information of a corresponding communication terminal related to the received call processing request from the call processing management database, each time a processing request is received or each time a processing request is received and the call-processing node does not have valid information of the corresponding communication terminal related to the received call processing request, the information comprising state information indicating whether the corresponding communication terminal is in communication or at standby;
  perform call processing related to the received call processing request using the information; and
  store information of a result of the call processing in the call processing management database.

8. A call-processing node in a communication system that provides a communication function to a communication terminal and includes a plurality of call-processing nodes, a call processing management database that is communicatively coupled with to each of the plurality of call-processing nodes via a communication path and holds data of each communication terminal necessary for call processing, and a control node, the call-processing node comprising:
 circuitry configured to
  receive one or more call processing requests as directed by the control node;
  acquire information of a corresponding communication terminal related to the received call processing request from the call processing management database each time a processing request is received or each time a processing request is received and the call-processing node does not have valid information of the corresponding communication terminal related to the received call processing request, the information comprising state information indicating whether the corresponding communication terminal is in communication or at standby;
  perform call processing related to the received call processing request using the information; and
  store information of a result of the call processing in the call processing management database.

9. A communication control method in a communication system that provides a communication function to a communication terminal and includes a plurality of call-processing nodes, a call processing management database that is communicatively coupled with each of the plurality of call-processing nodes via a communication path and holds data of each communication terminal necessary for call processing, and a control node, the communication control method comprising:
 recognizing, by the control node, states of the plurality of call-processing nodes;
 selecting, by the control node, a call-processing node among the plurality of call-processing nodes for processing a call processing request from the communication terminal based on the states of the plurality of call-processing nodes;
 performing control so that the call processing request is directed to the selected call-processing node;
 receiving, by at least one call-processing node of the plurality of call-processing nodes, the call processing request or one or more other call processing requests as directed by the control node;
 acquiring, by the call-processing node, information of a corresponding communication terminal related to the received call processing request from the call processing management database, each time a processing request is received or each time a processing request is received and the call-processing node does not have valid information of the corresponding communication terminal related to the received call processing request, the information comprising state information indicating whether the corresponding communication terminal is in communication or at standby;

performing, by the call-processing node, call processing related to the received call processing request using the information acquired in the acquiring; and storing, by the call-processing node, information of a result of the call processing performed in the performing in the call processing management database.

10. A communication control method in a call-processing node in a communication system that provides a communication function to a communication terminal and includes a plurality of call-processing nodes, a call processing management database that is communicatively coupled with each of the plurality of call-processing nodes via a communication path and holds data of each communication terminal necessary for call processing, and a control node, the communication control method comprising:

receiving one or more call processing requests as directed by the control node;

acquiring information of a corresponding communication terminal related to the received call processing request from the call processing management database, each time a processing request is received or each time a processing request is received and the call-processing node does not have valid information of the corresponding communication terminal related to the received call processing request, the information comprising state information indicating whether the corresponding communication terminal is in communication or at standby;

performing call processing related to the received call processing request using the information acquired in the acquiring; and storing information of a result of the call processing performed in the performing in the call processing management database.

11. The mobile communication system according to claim 1, wherein the call processing management database is communicatively coupled the plurality of call-processing nodes outside the flow control network.

* * * * *